(12) United States Patent
Kamm et al.

(10) Patent No.: US 9,713,884 B2
(45) Date of Patent: Jul. 25, 2017

(54) DIMENSIONALLY STABLE POLYURETHANE MOLDED BODIES HAVING LOW DENSITY

(75) Inventors: Andre Kamm, Bohmte (DE); Dong Liang, GuangZhou (CN); ZhiZhong Tang, Panyu Guangzhou (CN); LiHua Hu, Panyu Guangzhou (CN)

(73) Assignee: BASF SE, Ludwigshafen (DE)

( * ) Notice: Subject to any disclaimer, the term of this patent is extended or adjusted under 35 U.S.C. 154(b) by 557 days.

(21) Appl. No.: 13/885,917

(22) PCT Filed: Nov. 15, 2011

(86) PCT No.: PCT/EP2011/070088
§ 371 (c)(1),
(2), (4) Date: Jun. 10, 2013

(87) PCT Pub. No.: WO2012/065962
PCT Pub. Date: May 24, 2012

(65) Prior Publication Data
US 2013/0249134 A1   Sep. 26, 2013

(30) Foreign Application Priority Data

Nov. 16, 2010 (WO) ................ PCT/CN2010/078781

(51) Int. Cl.
| | | |
|---|---|---|
| *B29C 44/02* | (2006.01) | |
| *C08G 18/10* | (2006.01) | |
| *C08J 9/00* | (2006.01) | |
| *C08G 18/06* | (2006.01) | |
| C08G 18/66 | (2006.01) | |
| C08G 18/42 | (2006.01) | |
| B29C 44/10 | (2006.01) | |
| C08J 9/14 | (2006.01) | |
| C08G 101/00 | (2006.01) | |
| C08G 77/46 | (2006.01) | |

(52) U.S. Cl.
CPC .............. *B29C 44/02* (2013.01); *C08G 18/06* (2013.01); *C08G 18/10* (2013.01); *C08G 18/664* (2013.01); *C08J 9/0061* (2013.01); B29C 44/10 (2013.01); C08G 18/42 (2013.01); C08G 18/4238 (2013.01); C08G 18/6633 (2013.01); C08G 77/46 (2013.01); C08G 2101/00 (2013.01); C08G 2410/00 (2013.01); C08J 9/14 (2013.01); C08J 9/141 (2013.01); C08J 2375/04 (2013.01); C08J 2409/00 (2013.01); C08J 2423/00 (2013.01); C08J 2433/00 (2013.01); C08J 2483/04 (2013.01)

(58) Field of Classification Search
CPC .. B29C 44/02; B29C 44/10; C08J 9/14; C08J 9/141; C08G 18/06; C08G 18/10; C08G 18/6633; C08G 18/42; C08G 18/4238

USPC ................ 264/51, 53, 54; 521/110, 112
See application file for complete search history.

(56) References Cited

U.S. PATENT DOCUMENTS

| | | | |
|---|---|---|---|
| 3,304,273 A | 2/1967 | Stamberger | |
| 3,383,351 A | 5/1968 | Stamberger | |
| 3,523,093 A | 8/1970 | Stamberger | |
| 3,884,848 A * | 5/1975 | Ricciardi | C08G 18/637 521/110 |
| 4,764,537 A | 8/1988 | Horn et al. | |
| 5,130,344 A * | 7/1992 | Kollmeier | C08J 9/0061 521/111 |
| 5,710,185 A * | 1/1998 | Volkert | A43B 13/04 521/159 |
| 5,821,554 A | 10/1998 | Harada et al. | |
| 2006/0014908 A1* | 1/2006 | Rotermund | C04B 38/0022 525/452 |
| 2006/0089453 A1* | 4/2006 | Pajerski | C08G 18/0823 524/589 |
| 2009/0234039 A1* | 9/2009 | Schutte | A43B 13/04 521/137 |

FOREIGN PATENT DOCUMENTS

| | | |
|---|---|---|
| EP | 0 250 351 | 12/1987 |
| EP | 0 795 572 | 9/1997 |
| EP | 1 042 384 | 3/2002 |
| EP | 1 756 187 | 4/2008 |
| WO | 2005 098763 | 10/2005 |

OTHER PUBLICATIONS

Liu, "Cure Shrinkage Control of Polymerization Systems", 1990.*
International Search Report Issued Mar. 12, 2012 in PCT/EP11/70088 Filed Nov. 15, 2011.

* cited by examiner

*Primary Examiner* — Alison L Hindenlang
*Assistant Examiner* — Lawrence D Hohenbrink, Jr.
(74) *Attorney, Agent, or Firm* — Oblon, McClelland, Maier & Neustadt, L.L.P.

(57) ABSTRACT

The present invention relates to a process for producing polyurethane foam moldings where the density of the molding is at most 500 g/L, by mixing the following to give a reaction mixture: a) organic polyisocyanates with b) polyesterols, c) blowing agents, d) cell-opening additives selected from the group consisting of homo- or copolymers based on ethylhexyl acrylate, on polybutadiene, on polyisobutene, and on diorganosilicones, or a mixture of two or more of said antifoams, e) silicone-based cell stabilizers and optionally f) chain extenders and/or crosslinking agents, g) catalysts, and h) other auxiliaries and/or additives, and charging the materials to a mold, and permitting them to complete a reaction to give a polyurethane foam molding. The present invention further relates to polyurethane moldings obtainable by this process, and to the use of said moldings as shoe sole, steering wheel, seat, or armrest.

14 Claims, No Drawings

DIMENSIONALLY STABLE POLYURETHANE MOLDED BODIES HAVING LOW DENSITY

CROSS-REFERENCE TO RELATED APPLICATIONS

This application is a National Stage of PCT/EP2011/070088 filed on Nov. 15, 2011. This application is based upon and claims the benefit of priority to PCT/CN2010/078781 filed on Nov. 16, 2010.

BACKGROUND OF THE INVENTION

The present invention relates to a process for producing polyurethane foam moldings where the density of the molding is at most 450 g/L, by mixing the following to give a reaction mixture: a) organic polyisocyanates with b) polyesterols, c) blowing agents, d) cell-opening additives selected from the group consisting of homo- or copolymers based on ethylhexyl acrylate, on polybutadiene, on polyisobutene, and on diorganosilicones, or a mixture of two or more of said cell-opening additives, e) silicone-based cell stabilizers and optionally f) chain extenders and/or cross-linking agents, g) catalysts, and h) other auxiliaries and/or additives, and charging the materials to a mold, and permitting them to complete a reaction to give a polyurethane foam molding. The present invention further relates to polyurethane moldings obtainable by this process, and to the use of said moldings as shoe sole, steering wheel, seat, or armrest.

Within recent years, there has been a trend toward lower-weight shoe soles. However, in the case of polyurethane shoe soles the density reduction causes problems with the dimensional stability of the moldings. This means that the entire sole becomes smaller, or else that the surface quality of the shoe soles suffers because there are locations affected by shrinkage.

The literature discusses various ways of improving the dimensional stability of the polyurethanes. By way of example, DE 2402734 describes the production of integral polyurethane foams in which a prepolymer based on polyesterol is mixed with a polyol component based on polyetherols. A disadvantage of the resultant polyurethane systems is that, because the polyesterols and polyetherols are incompatible, mechanical properties are adversely affected and it is impossible to prevent shrinkage of the integral polyurethane foams.

The literature also discusses the use of graft polyols or of polymer polyols. By way of example, EP 1 042 384 describes the production of low-density dimensionally stable shoe soles based on polyetherol via use of large amounts of polyether graft polyols. A disadvantage of this process is that mechanical properties are markedly poorer than those of shoe soles based on polyesterol. Furthermore, the high content of polymer polyetherols has a disadvantageous effect on the viscosity of the polyol component.

EP 1 790 675 and EP 1 756 187 describe the addition of polymer polyols based on polyesterols to a polyester polyurethane. These systems are markedly more difficult to process because of the relatively high viscosity resulting from the large amounts of polyester polymer polyol. EP 1 790 675 and EP 1 756 187 also disclose the addition of polyetherol-based polymer polyols to a polyesterol polyurethane system. The comparative example of the specifications reveals that the use of polymer polyetherols leads to an integral foam with inadequate surface and coarse cell structure.

It was an object of the present invention to provide a process which can produce polyurethane foam moldings with density below 450 g/L, and in particular which can produce an integral polyurethane foam which has excellent surface quality and does not shrink during or immediately after its production.

BRIEF SUMMARY OF THE INVENTION

Said object is achieved via a process for producing polyurethane foam moldings where the density of the molding is at most 450 g/L, by mixing the following to give a reaction mixture: a) organic polyisocyanates with b) polyesterols, c) blowing agents, d) cell-opening additives selected from the group consisting of homo- or copolymers based on ethylhexyl acrylate, on polybutadiene, on polyisobutene, and on diorganosilicones, or a mixture of two or more of said cell-opening additives, e) silicone-based cell stabilizers and optionally f) chain extenders and/or cross-linking agents, g) catalysts, and h) other auxiliaries and/or additives, and charging the materials to a mold, and permitting them to complete a reaction to give a polyurethane foam molding.

DETAILED DESCRIPTION OF THE INVENTION

For the purposes of the invention, the term polyurethane foam moldings means polyurethane foams which are produced in a mold. For the purposes of the invention, integral polyurethane foams means polyurethane foams according to DIN 7726 with a marginal zone which, as a result of the shaping process, has higher density than the core. The overall envelope density here averaged over the core and the marginal zone is preferably above 80 g/L to 450 g/L, preferably from 150 g/L to 400 g/L, particularly preferably 180 g/L to 350 g/L, and in particular 200 to 300 g/L. Since integral polyurethane foams are also produced in a mold, the term polyurethane foam moldings also encompasses integral polyurethane foams.

The organic and/or modified polyisocyanates (a) used to produce the polyurethane foam moldings of the invention comprise the aliphatic, cycloaliphatic, and aromatic di- or polyfunctional isocyanates known from the prior art (constituent a-1), and also any desired mixtures thereof. Examples are diphenylmethane 4,4'-diisocyanate, diphenylmethane 2,4'-diisocyanate, the mixtures of monomeric diphenylmethane diisocyanates with diphenylmethane-diisocyanate homologs having a relatively large number of rings (polymer-MDI), tetramethylene diisocyanate, hexamethylene diisocyanate (HDI), isophorone diisocyanate (IPDI), tolylene 2,4- or 2,6-diisocyanate (TDI), and mixtures of the isocyanates mentioned.

It is preferable to use 4,4'-MDI. The 4,4'-MDI preferably used can comprise from 0 to 20% by weight of 2,4' MDI and small amounts, up to about 10% by weight, of allophanate- or uretonimine-modified polyisocyanates. It is also possible to use small amounts of polyphenylene polymethylene polyisocyanate (polymer—MDI). The total amount of these high-functionality polyisocyanates should not exceed 5% by weight of the isocyanate used.

Polyisocyanate component (a) is preferably used in the form of polyisocyanate prepolymers. These polyisocyanate prepolymers are obtainable by reacting polyisocyanates (a-1) described above with polyols (a-2) to give the prepolymer, for example at temperatures of from 30 to 100° C., preferably at about 80° C.

Polyols (a-2) are known to the person skilled in the art and are described by way of example in "Kunststoffhandbuch [Plastics handbook], Volume 7, Polyurethane [Polyurethanes]", Carl Hanser Verlag, 3rd Edition 1993, chapter 3.1. It is preferable that the polyols (a-2) used here comprise the polyesterols described under b).

During the production of the isocyanate prepolymers, conventional chain extenders or crosslinking agents are optionally added to the polyesterols mentioned. These substances are described under f) below.

The polyesterols b) used comprise polyesterols having at least two hydrogen atoms reactive toward isocyanate groups. It is preferable that the number-average molar mass of polyesterols b) is greater than 450 g/mol, particularly greater than 500 to smaller than 12 000 g/mol, and in particular from 600 to 8000 g/mol.

By way of example, polyester polyols can be prepared from organic dicarboxylic acids having from 2 to 12 carbon atoms, preferably from aliphatic dicarboxylic acids having from 4 to 6 carbon atoms, and from polyhydric alcohols, preferably diols, having from 2 to 12 carbon atoms, preferably from 2 to 6 carbon atoms. Examples of dicarboxylic acids that can be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids here can be used either individually or else in a mixture with one another. Instead of the free dicarboxylic acids, it is also possible to use the corresponding dicarboxylic acid derivatives, e.g. dicarboxylic esters of alcohols having from 1 to 4 carbon atoms, or dicarboxylic anhydrides. It is preferable to use dicarboxylic acid mixtures composed of succinic, glutaric, and adipic acid in quantitative proportions of, for example, from 20 to 35: from 35 to 50: from 20 to 32 parts by weight, and in particular adipic acid. Examples of di- and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol, and trimethylolpropane. It is preferable to use ethanediol, diethylene glycol, 1,4-butanediol, 1,5-pentanediol, and 1,6-hexanediol. It is also possible to use polyester polyols derived from lactones, e.g. ε-caprolactone, or hydroxycarboxylic acids, e.g. ω-hydroxycaproic acid.

For preparation of the polyester polyols, the organic, e.g. aromatic, and preferably aliphatic, polycarboxylic acids and/or their derivatives and polyhydric alcohols can be polycondensed without a catalyst or preferably in the presence of esterification catalysts, advantageously in an atmosphere composed of inert gas, for example nitrogen, carbon monoxide, helium, argon, etc., in the melt at temperatures which are from 150 to 250° C., preferably from 180 to 220° C., optionally at reduced pressure, until the desired acid number has been reached, this preferably being smaller than 10, particularly preferably smaller than 2. According to one preferred embodiment, the esterification mixture is polycondensed at the abovementioned temperatures until the acid number is from 80 to 30, preferably from 40 to 30, at atmospheric pressure, and then at a pressure which is smaller than 500 mbar, preferably from 50 to 150 mbar. Examples of esterification catalysts that can be used are iron catalysts, cadmium catalysts, cobalt catalysts, lead catalysts, zinc catalysts, antimony catalysts, magnesium catalysts, titanium catalysts, and tin catalysts, in the form of metals, of metal oxides, or of metal salts. However, the polycondensation process can also be carried out in a liquid phase in the presence of diluents and/or entrainers, e.g. benzene, toluene, xylene, or chlorobenzene, for the azeotropic removal of the water of condensation by distillation. The polyester polyols are advantageously produced by polycondensing the organic polycarboxylic acids and/or polycarboxylic acid derivatives and polyhydric alcohols in a molar ratio of 1:1 to 1.8, preferably 1:1.05 to 1.2.

The functionality of the resultant polyester polyols is preferably from 2 to 4, in particular from 2 to 3, their molar mass being from 480 to 3000 g/mol, preferably from 1000 to 3000 g/mol.

Other suitable polyesterols are polymer-modified polyesterols, preferably graft polyesterols. These are what is known as a polymer polyesterol, usually having from 5 to 60% by weight, preferably from 10 to 55% by weight, particularly preferably from 15 to 50% by weight, and in particular from 20 to 40% by weight, content of preferably thermoplastic polymers. These polymer polyesterols are described by way of example in WO 05/098763 and EP-A 250 351, and are usually prepared via free-radical polymerization of suitable olefinic monomers, such as styrene, acrylonitrile, (meth)acrylates, (meth)acrylic acid, and/or acrylamide, in a polyesterol serving as graft base. The side chains are generally produced via transfer of the free radicals from growing polymer chains to polyesterols or polyetherols. The polymer polyesterol comprises, alongside the graft copolymer, mainly the homopolymers of the olefins, dispersed in unaltered polyesterol.

In one preferred embodiment, the monomers used comprise acrylonitrile, styrene, or preferably acrylonitrile and styrene. The monomers are optionally polymerized in the presence of further monomers, in other words an unsaturated, free-radically polymerizable polyol, of a macromer, and of a moderator, and with use of a free-radical initiator, mostly azo compounds or peroxide compounds, in a polyesterol or polyetherol as continuous phase. This process is described by way of example in DE 111 394, U.S. Pat. No. 3,304,273, U.S. Pat. No. 3,383,351, U.S. Pat. No. 3,523,093, DE 1 152 536, and DE 1 152 537.

During the free-radical polymerization process, the macromers are concomitantly incorporated into the copolymer chain. This gives block copolymers having a polyester and a polyacrylonitrile-styrene block, where these act as compatibilizers at the interface of continuous phase and disperse phase and suppress agglomeration of the polymer polyesterol particles. The proportion of the macromers is usually from 1 to 20% by weight, based on the total weight of the monomers used to produce the polymer polyol.

If polymer polyol is comprised, this is preferably present together with other polyesterols. It is particularly preferable that the proportion of polymer polyol is greater than 5% by weight, based on the total weight of component (b). By way of example, the amount comprised of the polymer polyesterols can be from 7 to 90% by weight, or from 11 to 80% by weight, based on the total weight of component (b).

Alongside polyesterols (b), it is also possible to use other polyols having a number-average molar mass greater than 500 g/mol, examples being polyetherols. However, the proportion of the other polyols is preferably less than 40% by weight here, particularly preferably less than 20% by weight, very particularly preferably less than 10% by weight, and in particular 0% by weight, based on the total weight of polyesterols (b) and of the further polyols.

Blowing agents c) are moreover present during the production of polyurethane foam moldings. Said blowing agents c) can comprise water. Blowing agents c) can comprise not only water but also well-known compounds having chemical and/or physical action. The term chemical blowing agents means compounds which form gaseous products via reaction with isocyanate, an example being water or formic acid. The term physical blowing agents means compounds which have been emulsified or dissolved in the starting materials for polyurethane production and which evaporate under the conditions of polyurethane formation. By way of example, these are hydrocarbons, halogenated hydrocarbons, and other compounds, e.g. perfluorinated alkanes, such as perfluorohexane, fluorochlorocarbons, and ethers, esters, ketones, acetals, or a mixture thereof, for example (cyclo)aliphatic hydrocarbons having from 4 to 8 carbon atoms, or fluorocarbons, such as Solkane® 365 mfc from Solvay Fluorides LLC. In one preferred embodiment, the blowing agent used comprises a mixture comprising at least one of said blowing agents and water, and in particular water alone as blowing agent. If no water is used as blowing agent, it is preferable that the blowing agents used are exclusively physical.

In one preferred embodiment, the content of water is from 0.1 to 2% by weight, preferably from 0.2 to 1.5% by weight, particularly preferably 0.3 to 1.2% by weight, based on the total weight of components a) to h).

In another preferred embodiment, hollow microbeads which comprise physical blowing agent are added as additional blowing agent to the reaction of components a) to h). The hollow microbeads can also be used in a mixture with the abovementioned blowing agents.

The hollow microbeads are usually composed of a shell made of thermoplastic polymer, with, in the core, a liquid, low-boiling-point substance based on alkanes. The production of these hollow microbeads is described by way of example in U.S. Pat. No. 3,615,972. The diameter of the hollow microbeads is generally from 5 to 50 µm. Examples of suitable hollow microbeads are obtainable with trademark Expancell® from Akzo Nobel.

The amount added of the hollow microbeads is generally from 0.5 to 5% by weight, based on the total weight of components b), c) and f).

The cell-opening additives (d) used comprise compounds selected from the group consisting of homo- or copolymers, preferably of copolymers based on ethylhexyl acrylate, on polybutadiene, on polyisobutene, and on diorganosilicones, or a mixture of two or more of said cell-opening additives.

Copolymers based on ethylhexyl acrylate and hydroxyethyl methacrylate are obtainable here via copolymerization of ethylhexyl acrylate, of hydroxyethyl methacrylate and optionally of other monomers copolymerizable with said monomers. Other copolymerizable monomers used are preferably acrylates or methacrylates. The amount of other copolymerizable monomers used is particularly preferably less than 10% and with particular preference zero.

The weight-average molar mass of said copolymers is preferably from 2000 to 200 000 g/mol, particularly preferably from 5000 to 75 000 g/mol. In one particular embodiment of the invention, homopolymers of polyethylhexyl acrylate are used.

Polyisobutene is preferably used in liquid form. These materials are polyisobutylenes having a number-average molar mass which is preferably 300 to 3000 g/mol. Polyisobutylenes are known and are by way of example available commercially with trademarks Oppanol® or Glisopal®. Polyisobutene is usually synthesized via cationic polymerization of 2-methylpropene with use of Lewis acids, such as boron trifluoride or aluminum trichloride, in conjunction with water or alcohols.

Polybutadienes are obtained via polymerization of 1,3-butadiene with Ziegler-Natta catalysts. It is preferable here to use homopolymers or copolymers that are based on at least 80 mol % of butadiene. Preference is given here to use of polybutadiene oils. These are polybutadienes that have a weight-average molar mass from 300 to 30 000 g/mol, preferably 500 to 15 000 g/mol. Polybutadiene oils are known and are available commercially.

Diorganosilicones are silicone polymers where each of the silicon atoms bonded by way of oxygen atoms bears organic radicals preferably in the form of two hydrocarbon systems, e.g. aromatic groups, for example phenyl groups, or cyclic or linear, or branched-chain aliphatic hydrocarbon groups, examples being ethyl groups or methyl groups. These radicals can be identical or different; preference is given here to unsubstituted hydrocarbon groups. It is particularly preferable that at least 80 mol % of the radicals are aliphatic linear or branched-chain hydrocarbon radicals each having 1 to 20, preferably 1 to 10, and particularly preferably 1 to 4, carbon atoms. It is preferable here that the diorganosiloxanes of the invention have a weight-average molar mass of from 161 to 100 000 g/mol, preferably 500 to 10 000 g/mol. It is particularly preferable that said compounds have foam-destabilizing character and can be used as antifoams in organic mixtures. These products are known by way of example by the tradename Worlée Add 373 N from Worlée Chemie GmbH.

The proportion of cell-opening additives (d) is preferably 0.2 to 3.5% by weight, particularly preferably 0.5 to 2% by weight, based in each case on the total weight of components b) to (h).

Silicone-based cell stabilizers (e) used comprise silicone-based compounds which reduce the surface tension of the polyesterols. These compounds are preferably compounds which have amphiphilic structure, and this means that they have two molecular moieties having different polarity. It is preferable that the silicone-based cell stabilizer has one molecular moiety having organosilicon units, an example being dimethylsiloxane or methylphenylsiloxane, and has one molecular moiety having a chemical structure which has some similarity to the polyesterols (b). These are preferably polyoxyalkylene units. The silicone-based cell stabilizers (e) particularly preferably comprise polysiloxane-polyoxyalkylene block copolymers having less than 75% by weight of oxyethylene content, based on the total content of polyoxyalkylene units. These preferably comprise polyethylene oxide units and/or polypropylene oxide units. The molar mass of the polyoxyalkylene side chains is preferably at least 1000 g/mol of side chains. These compounds are known and are described by way of example in "Kunststoffhandbuch, Band 7, Polyurethane" [Plastics handbook, volume 7, Polyurethane], Carl Hanser Verlag, 3rd edition 1993, chapter 3.4.4.2, and by way of example they can be produced via reaction of siloxane, such as polydimethylsiloxane, with polyoxyalkylene, in particular with polyethylene oxide, with polypropylene oxide, or with copolymers of polyethylene oxide and polypropylene oxide used. It is possible here to obtain polysiloxane-polyoxyalkylene block copolymers which has the oxyalkylene chain as terminal group or as one or more side chains. The silicone-based cell stabilizers (e) can have OH groups, but are preferably free from OH groups. This can be achieved by using monofunctional alcohols, such as butanol, as starter to produce the polyoxyalkylenes. By way of example, silicone-based cell stabilizers used can comprise known foam stabilizers based on silicones, e.g. Niax Silicone L1501, L 1505, L1540, L 1593, L 1602, or L 1609 from Monentive; Dabco® DC 193, Dabco® DC 3041, Dabco® DC 3042, Dabco® DC 3043, Dabco® DC 5000, Dabco® DC 5169, Dabco® DC 2525, Dabco® DC 2584, or Dabco® DC 5160 from Air Products; Tegostab® BF 2270, Tegostab® BF 2370, Tegostab® BF 2470, Tegostab® B 8110, Tegostab® B 8225, Tegostab® B 8255, Tegostab® B 8317, Tegostab® B 8325, Tegostab® B 8905, Tegostab® B 8946 PF, Tegostab® B 8948, Tegostab® B 8950, Tegostab® B 8952, Tegostab® B 8960, or Tegostab® B 8486 from Goldschmidt. In one particularly preferred embodiment of the invention, a combination of a silicone-based cell stabilizer with an additive is used to improve shear stability. These shear stabilizers are known, for example with tradename Niax Silicone L 1540 from Monentive.

The proportion of the silicone-based cell stabilizer here is preferably 0.1 to 4% by weight, particularly preferably 0.2 to 3% by weight, and in particular 0.5 to 2.5% by weight, based in each case on the total weight of components (b) to (h).

Chain extenders and/or crosslinking agents f) used comprise substances having a molar mass that is preferably smaller than 450 g/mol, particularly preferably from 60 to 400 g/mol, where chain extenders have two hydrogen atoms reactive toward isocyanates and crosslinking agents have three hydrogen atoms reactive toward isocyanates. These can preferably be used individually or in the form of a mixture. It is preferable to use diols and/or triols with molecular weights smaller than 400, particularly preferably from 60 to 300 and in particular 60 to 150. Examples of those that can be used are aliphatic, cycloaliphatic, and/or araliphatic diols having from 2 to 14, preferably from 2 to 10, carbon atoms, e.g. ethylene glycol, 1,3-propanediol, 1,10-decanediol, 1,2-, 1,3-, or 1,4-dihydroxycyclohexane, diethylene glycol, dipropylene glycol, and 1,4-butanediol, 1,6-hexanediol, and bis(2-hydroxyethyl)hydroquinone, triols, such as 1,2,4- or 1,3,5-trihydroxycyclohexane, glycerol, and trimethylolpropane, and low-molecular-weight hydroxylated polyalkylene oxides based on ethylene oxide and/or on propylene 1,2-oxide, and on the abovementioned diols and/or triols as starter molecules. Chain extenders (f) used with particular preference comprise monoethylene glycol, 1,4-butanediol, diethylene glycol, glycerol, or a mixture thereof.

To the extent that chain extenders, crosslinking agents, or a mixture of these is/are used, the amounts advantageously used of these are from 1 to 60% by weight, preferably 1.5 to 50% by weight, and in particular 2 to 40% by weight, based on the weight of components b) and f).

Catalysts g) used for producing the polyurethane foams are preferably compounds which markedly accelerate the reaction of the polyesterols b) and optionally chain extenders and crosslinking agents f) with the organic, optionally modified, polyisocyanates a). Mention may be made of the following examples: amidines, such as 2,3-dimethyl-3,4,5,6-tetrahydropyrimidine, tertiary amines, such as triethylamine, tributylamine, dimethylbenzylamine, N-methyl-, N-ethyl-, or N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds, such as triethanolamine, triisopropanolamine, N-methyl- and N-ethyldiethanolamine, and dimethylethanolamine. Organometallic compounds can also be used, preferably organotin compounds, such as stannous salts of organic carboxylic acids, e.g. stannous acetate, stannous octoate, stannous ethylhexoate, and stannous laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) involves an ester, it is preferable to use exclusively amine catalysts.

It is preferable to use from 0.001 to 5% by weight, in particular from 0.05 to 2% by weight, of catalyst or catalyst combination, based on the weight of component (b).

Auxiliaries and/or additives (h) can optionally also be added to the reaction mixture for production of the polyurethane foams. Examples that may be mentioned are release agents, fillers, dyes, pigments, hydrolysis stabilizers, odor-absorbent substances, and fungistatic and/or bacteriostatic substances.

Examples that may be mentioned of suitable release agents are: reaction products of fatty esters with polyisocyanates, salts derived from polysiloxanes comprising amino groups and fatty acids, salts derived from saturated or unsaturated (cyclo)aliphatic carboxylic acids having at least 8 carbon atoms and tertiary amines, and also in particular internal release agents, e.g. carboxylic esters and/or carboxamides, produced via esterification or amidation of a mixture composed of montanic acid and of at least one aliphatic carboxylic acid having at least 10 carbon atoms with at least dibasic alkanolamines, polyols, and/or polyamines whose molar masses are from 60 to 400 g/mol, as disclosed by way of example in EP 153 639, or with a mixture composed of organic amines, metal stearates, and organic mono- and/or dicarboxylic acids or their anhydrides, as disclosed by way of example in DE-A 3 607 447, or a mixture composed of an imino compound, of a metal carboxylate and optionally of a carboxylic acid, as disclosed by way of example in U.S. Pat. No. 4,764,537. It is preferable that reaction mixtures of the invention comprise no other release agents.

Fillers, in particular reinforcing fillers, are the usual organic and inorganic fillers, reinforcing agents, weighting agents, coating agents, etc. that are known per se. Individual fillers that may be mentioned by way of example are: inorganic fillers, such as silicatic minerals, such as phyllosilicates, e.g. antigorite, bentonite, serpentine, hornblendes, amphiboles, chrysotile, and talc, metal oxides, e.g. kaolin, aluminum oxides, titanium oxides, zinc oxide, and iron oxides, metal salts, e.g. chalk and baryte, and inorganic pigments, e.g. cadmium sulfide, and zinc sulfide, and also glass, etc. It is preferable to use kaolin (China clay), aluminum silicate, and coprecipitates made of barium sulfate and aluminum silicate. Examples of organic fillers that can be used are: carbon black, melamine, colophony, cyclopentadienyl resins, and graft polymers, and also cellulose fibers, polyamide fibers, polyacrylonitrile fibers, polyurethane fibers, and polyester fibers, where these are based on aromatic and/or aliphatic dicarboxylic esters, and in particular carbon fibers.

The inorganic and organic fillers can be used individually or in the form of a mixture, and the amounts of these advantageously added to the reaction mixture are from 0.5 to 50% by weight, preferably from 1 to 40% by weight, based on the weight of components a) to h).

The amounts of the starting components a) to h) mixed with one another in the process of the invention are such that the equivalence ratio of NCO groups of the polyisocyanates (a) to the entirety of the reactive hydrogen atoms of components (b), (c), and (d) is 1:0.8 to 1:1.25, preferably 1:0.9 to 1:1.15. A ratio of 1:1 here corresponds to an isocyanate index of 100. For the purposes of the present invention, the isocyanate index is the stoichiometric ratio of isocyanate groups to groups reactive toward isocyanate, multiplied by 100.

The present invention further provides a polyurethane molding obtainable by the process of the invention.

The polyurethane foam moldings of the invention are preferably produced by the one-shot process with the aid of low-pressure or high-pressure technology, in closed, advantageously temperature-controlled molds. The molds are usually composed of metal, e.g. aluminum or steel. These procedures are described by way of example by Piechota and Rohr in "Integralschaumstoff" [Integral foam], Carl-Hanser-Verlag, Munich, Vienna, 1975, or in "Kunststoffhandbuch", Band 7, Polyurethane, 3, Auflage, 1993, chapter 7.

To this end, starting components a) to h) are mixed, preferably at a temperature of from 15 to 90° C., particularly preferably from 25 to 55° C., and the reaction mixture is introduced into the mold, optionally at elevated pressure. The mixing process can be carried out mechanically by means of a stirrer or a mixing screw, or under high pressure in what is known as the counterpressure-injection process. The mold temperature is advantageously 20 to 160° C., preferably 30 to 120° C., particularly preferably 30 to 60° C. For the purposes of the invention, the mixture of components a) to h) here is termed reaction mixture when conversions in the reaction are smaller than 90%, based on the isocyanate groups.

The amount of the reaction mixture introduced into the mold is judged in such a way that the density of the resultant moldings, in particular integral foam, is preferably 80 g/L to 450 g/L, with preference from 150 g/L to 400 g/L, with particular preference 180 g/L to 350 g/L, and in particular 200 to 300 g/L. The degrees of compaction for production of the integral polyurethane foams of the invention are in the range from 1.1 to 8.5, preferably from 1.6 to 7.0.

The polyurethane foam moldings of the invention are preferably used in the form of shoe sole and particularly preferably in the form of (mid)sole, e.g. for outdoor shoes, sports shoes, sandals, and boots. In particular, the integral polyurethane foams of the invention are used in the form of midsole for sports shoes, or in the form of sole material for high-heeled ladies' shoes. The thickness of this sole at the thickest location is preferably more than 3 cm, particularly preferably more than 5 cm, where the thickness of the sole means the distance along a vertical line between that side of the sole that faces toward the ground and the upper side of the sole. Polyurethane foams of the invention can moreover be used in the interiors of conveyances, for example in automobiles in the form of steering wheels, headrests, or control knobs, or in the form of chair armrests. Other possible uses are in the form of armrests for chairs or in the form of motorcycle seats.

Examples will be used below to illustrate the invention.

EXAMPLES

The following compounds were used:
Polyol 1: Polyesterol based on adipic acid, monoethylene glycol, butanediol and trimethylolpropane, and an OH number of 44 mg KOH/g
Polyol 2: Polyesterol based on adipic acid, monoethylene glycol, and butanediol, with an OH number of 56 mg KOH/g
Polyol 3: Hoopol® PM 245 polymer polyesterol from Synthesia, with an OH number of 60 mg KOH/g
Polyol 4: Polyesterol based on adipic acid, monoethylene glycol, butanediol and trimethylolpropane, with an OH number of 48 mg KOH/g
CE: Monoethylene glycol
Cat 1: Lupragen® N 203 from BASF
Cat 2: Lupragen® N 206 from BASF
Cat 3: XD 103 from Air Products
Cat 4: Toyocat® NCT from Tosoh
Cat 5: 1-methylimidazole
Cat 6: Lupragen® N202 from BASF
Expancel: Expancel® 051 DU 40
CO1: Copolymer based on ethylhexyl acrylate and hydroxyethyl methacrylate
CO2: Additive based on polybutadiene with weight-average molar mass 10 000 g/mol
CO3: Additive based on polyisobutene with number-average molar mass Mn 1000 g/mol
CO4: Worleé Add 373 N, additive based on silicones dissolved in isoparaffins from Worleé
Stabi 1: Stabilizer based on polysiloxane-polyoxyalkylene polymers for improving the shear stability of the foam
Stabi 2: Stabilizer based on polysiloxane-polyoxyalkylene polymers
Stabi 3: LK 221-E adhesion promoter from Air Products
MES: Lupranat® MES from Elastogran GmbH (MMDI, content of 4,4'-MDI>90%)
MM103: Lupranat® MM103 from Elastogran GMBH (<50% of carbodiimide-modified MMDI in MMDI)
DEO: Diethyl oxalate
BC: Benzyl chloride
V65: Azo initiator from Wako
EHA: Ethylhexyl acrylate from Aldrich
HEMA: Hydroxyethyl methacrylate from Aldrich
MEK: Methyl ethyl ketone from Aldrich
Prepolymer Production:
Prepolymer 1:
21.6 kg of Lupranat MES were charged to a prepolymer reactor with 3.2 kg of MM103 and $4*10^{-4}$ kg of benzyl chloride, and heated to a temperature of 60° C. Once the temperature had been reached, a mixture of 0.4 kg of DEO, 10.8 kg of polyol 2, and 4 kg of polyol 4 was added slowly over a period of 30 minutes. After the addition, the mixture was heated to 80° C. and stirred at this temperature for 2 hours. The NCO content of the resultant prepolymer was 18.9%.
Prepolymer 2:
26.0 kg of Lupranat MES were charged to a prepolymer reactor with 2.4 kg of MM103 and $4*10^{-4}$ kg of benzyl chloride, and heated to a temperature of 60° C. Once the temperature had been reached, 11.6 kg of polyol 2 were added slowly over a period of 30 minutes. After the addition, the mixture was heated to 80° C. and stirred at this temperature for 2 hours. The NCO content of the resultant prepolymer was 22.2%.
Synthesis of Cell Opener CO1:
100 g of methyl ethyl ketone and 10 g of a solution 1 made of 99 g of ethylhexyl acrylate, 1 g of hydroxyethyl methacrylate, and 100 g of methyl ethyl ketone were mixed in a 500 mL 4-necked flask with thermometer, blade stirrer, nitrogen supply, and dropping funnel. 1 mL of a solution 2, comprising 1.25 g of Wako® V65 and 50 mL of methyl ethyl ketone were added to this mixture, and the mixture was heated to 65° C. Once the temperature had reached 65° C., 90 g of solution 1 were added over a period of 2 hours, and after 1 hour and after the end of the addition of solution 1 in each case 1.5 mL of solution 2 were added to the mixture in the 4-necked flask. Once the addition had ended, the temperature was increased to 70° C., and the mixture was stirred at 70° C. for 1 hour. 40 mL of solution 2 were then added to the mixture, which was heated to 75° C. and stirred at this temperature for a further 2 hours. The viscous mixture was diluted with 125 g of methyl ethyl ketone, transferred to a flask, and then freed from methyl ethyl ketone on a rotary evaporator. The final product is a mass which has high viscosity at room temperature and which is easy to handle at 45° C.

Comparative Examples 1-2 & Inventive Examples 1-5

|  | Comp E1 | Comp E2 | IE1 | IE2 | IE3 | IE4 | IE5 |
|---|---|---|---|---|---|---|---|
| Polyol 1 | 32.401 |  | 32.201 | 32.134 | 32.234 | 31.812 |  |
| Polyol 2 | 41.659 | 82.30 | 41.359 | 41.315 | 41.328 | 40.902 | 82.05 |
| Polyol 3 | 6.943 | 5.00 | 6.942 | 6.886 | 6.886 | 6.817 | 5.00 |
| Polyol 4 | 4.629 |  | 4.629 | 4.591 | 4.591 | 4.545 |  |
| CE | 7.406 | 9.00 | 7.394 | 7.345 | 7.345 | 7.271 | 9.00 |
| Cat 1 | 0.602 |  | 0.602 | 0.597 | 0.597 | 0.591 |  |
| Cat 2 | 0.065 |  | 0.065 | 0.064 | 0.064 | 0.064 |  |
| Cat 3 | 1.666 |  | 1.666 | 1.653 | 1.653 | 1.636 |  |
| Cat 4 |  | 0.90 |  |  |  |  | 0.90 |
| Cat 5 |  | 0.20 |  |  |  |  | 0.20 |
| Cat 6 |  | 0.40 |  |  |  |  | 0.40 |
| CO1 | 0 |  | 0.512 | 0 | 0 | 0 |  |
| CO2 | 0 |  | 0 | 0.826 | 0 | 0 | 0.25 |
| CO3 | 0 |  | 0 | 0 | 0.713 | 0 |  |
| CO4 | 0 |  | 0 | 0 | 0 | 1.636 |  |
| Stabi 1 | 0.417 | 0.50 | 0.417 | 0.413 | 0.413 | 0.409 | 0.50 |
| Stabi 2 | 0.417 | 0.50 | 0.417 | 0.413 | 0.413 | 0.409 | 0.50 |
| Stabi 3 | 0.278 |  | 0.278 | 0.275 | 0.275 | 0.273 |  |
| Water | 0.741 | 1.20 | 0.741 | 0.734 | 0.734 | 0.727 | 1.20 |
| Expancel | 2.777 |  | 2.777 | 2.754 | 2.754 | 2.727 |  |

In order to obtain a polyurethane foam, the polyol mixtures of examples Comp 1 and IE1-IE4 were appropriately mixed with prepolymer 1, using an isocyanate index of 96. After the mixing process, the reactive system was transferred to a cup or, for the production of moldings, to a plate mold of dimensions 20*20*1 cm, or to a sole mold. The polyurethane foam could rise freely in the cup and was utilized to determine free density, and to indicate shrinkage behavior. The polyurethane foam molding obtained was utilized to assess surface quality and, respectively, foam structure.

In order to obtain a polyurethane foam, the polyol mixtures of examples Comp 2 and IE5 were appropriately mixed with the prepolymer 2, using an isocyanate index of 94. After the mixing process, the reactive system was transferred to a cup or, for the production of moldings, to a plate mold of dimensions 20*20*1 cm, or to a sole mold. The polyurethane foam could rise freely in the cup and was utilized to determine free density, and to indicate shrinkage behavior. The polyurethane foam molding obtained was utilized to assess surface quality and, respectively, foam structure.

The table below lists the results:

|  | Comp1 | Comp2 | IE1 | IE2 | IE3 | IE4 | IE5 |
|---|---|---|---|---|---|---|---|
| Cream time [s] | 10 | 12 | 10 | 9 | 11 | 11 | 12 |
| Full rise time [s] | 70 | 50 | 68 | 73 | 75 | 80 | 47 |
| Free density [g/L] | 152 | 122 | 150 | 154 | 158 | 167 | 125 |
| Density of molding [g/L] | 325 | 259 | 325 | 325 | 325 | 325 | 252 |
| Shrinkage | − | +/− | ++ | ++ | ++ | ++ | ++ |
| Foam structure | ++ | ++ | ++ | + | ++ | ++ | ++ |

++ no shrinkage; + slight shrinkage; +/− moderate shrinkage; − severe shrinkage; −− extreme shrinkage ++ homogeneous fine-cell foam structure; + homogeneous foam structure; − coarse cell foam structure; −− inhomogeneous coarse-cell foam structure As can be seen from example Comp 1 and from inventive examples IE1-IE5, use of polyacrylates, polybutadiene, polyisobutene, or silicones to dimensionally stable foams with homogeneous foam structure.

The invention claimed is:

1. A process for producing a polyurethane foam molding, the process comprising:
   mixing an organic polyisocyanate with
      a polyesterol,
      a blowing agent,
      at least one cell-opening additive which is a homopolymer or copolymer based on an ethylhexyl acrylate,
      a silicone-based cell stabilizer, comprising one molecular moiety having organosilicon units and one molecular moiety having polyoxyalkylene units, and optionally
      a chain extender, a crosslinking agent, or both,
      a catalyst, and
      other auxiliaries, additives, or both;
   charging to a mold; and
   permitting to complete a reaction to obtain the polyurethane foam molding,
   wherein:
      the silicone-based cell stabilizer is a polysiloxane-polyoxyalkylene block copolymer having less than 75% by weight of oxyethylene content, based on a total weight of polyoxyalkylene in the block polymer, and a weight-average molar mass of the polyoxyalkylene blocks is greater than 1000 g/mol;
      a content of the cell-opening additive based on a total weight of the polyesterol, the blowing agent, the cell-opening additive, the stabilizer, the chain extender, the crosslinking agent, the catalyst, the other auxiliaries and other additives is from 0.2 to 3.5% by weight; and
      a content of the stabilizer, based on a total weight of the polyesterol, the blowing agent, the cell-opening additive, the stabilizer, the chain extender, the crosslinking agent, the catalyst, the other auxiliaries and other additives is from 0.2 to 3% by weight.

2. The process according to claim 1, comprising mixing the organic polyisocyanate with more than one of the silicone-based cell stabilizer.

3. The process according to claim 1, wherein a content of the cell-opening additive based on a total weight of the polyesterol, the blowing agent, the cell-opening additive, the stabilizer, the chain extender, the crosslinking agent, the catalyst, the other auxiliaries and other additives is from 0.5 to 2% by weight.

4. The process according to claim 1, wherein a content of the stabilizer, based on a total weight of the polyesterol, the blowing agent, the cell-opening additive, the stabilizer, the chain extender, the crosslinking agent, the catalyst, the other auxiliaries and other additives is from 0.5 to 2.5% by weight.

5. The process according to claim 1, comprising mixing a further polyol having a molar mass greater than 500 g/mol, wherein an amount of the further polyol, based on a total weight of the polyesterol and the further polyol is less than 10% by weight.

6. A polyurethane molding obtained by a process according to claim 1.

7. The polyurethane molding according to claim 6, wherein the molding is adapted to function as a shoe sole, steering wheel, seat, or armrest.

8. The process according to claim 2, wherein a content of the cell-opening additive based on a total weight of the polyesterol, the blowing agent, the cell-opening additive, the stabilizer, the chain extender, the crosslinking agent, the catalyst, the other auxiliaries and other additives is from 0.2 to 3.5% by weight.

9. The process according to claim 2, wherein a content of the more than one stabilizer, based on a total weight of the polyesterol, the blowing agent, the cell-opening additive, the stabilizer, the chain extender, the crosslinking agent, the catalyst, the other auxiliaries and other additives is from 0.2 to 3% by weight.

10. The process according to claim 3, wherein a content of the stabilizer, based on a total weight of the polyesterol, the blowing agent, the cell-opening additive, the stabilizer, the chain extender, the crosslinking agent, the catalyst, the other auxiliaries and other additives is from 0.5 to 2% by weight.

11. The process according to claim 2, comprising mixing a further polyol having a molar mass greater than 500 g/mol, wherein an amount of the further polyol, based on a total weight of the polyesterol and the further polyol is less than 10% by weight.

12. The process according to claim 3, comprising mixing a further polyol having a molar mass greater than 500 g/mol, wherein an amount of the further polyol, based on a total weight of the polyesterol and the further polyol is less than 10% by weight.

13. The process according to claim 4, comprising mixing a further polyol having a molar mass greater than 500 g/mol, wherein an amount of the further polyol, based on a total weight of the polyesterol and the further polyol is less than 10% by weight.

14. A polyurethane molding obtained by a process according to claim 2.

* * * * *